United States Patent [19]

Watanabe

[11] 4,373,833
[45] Feb. 15, 1983

[54] MACHINE FOR USE IN IMPLANTING PLANT SUPPORTING STAKES

[76] Inventor: Kazuki Watanabe, P.O. Box 127, Oceanside, Calif. 92054

[21] Appl. No.: 203,335

[22] Filed: Nov. 3, 1980

[51] Int. Cl.³ .............................................. E02F 5/10
[52] U.S. Cl. ........................................ 405/36; 111/3; 405/174
[58] Field of Search .............................. 405/174–183, 405/36, 37; 111/2, 3

[56] References Cited

U.S. PATENT DOCUMENTS

| | | | |
|---|---|---|---|
| 1,678,643 | 7/1928 | Kassebeer | 111/3 |
| 3,643,611 | 2/1972 | Owens et al. | 111/2 |
| 3,664,141 | 5/1972 | Wyatt | 405/174 |
| 3,813,888 | 6/1974 | Purviance | 405/180 |
| 4,167,911 | 9/1979 | Masuda et al. | 47/73 X |

FOREIGN PATENT DOCUMENTS 2261700 9/1975 France .................... 113/3

*Primary Examiner*—Dennis L. Taylor
*Attorney, Agent, or Firm*—Frank D. Gilliam

[57] ABSTRACT

A machine to be pulled by a mobile power unit, such as a farm tractor or the like. The machine comprises a plow member with a forward protruding and downwardly angled digging member for forming a trench, a hollow vertical guide member with upwardly angled fins on each side thereof for guiding a stake manually inserted into the hollow portion, a pair of vertical adjustable opposing wheels for repacking the earth adjacent the trench inserted stakes and scraper blades for pushing a portion of the earth removed from the trench back into the trench and substantially leveling the remaining earth from the trench to a pre-trench state. The machine may also provided with an irrigation pipe laying means wherein the pipe is layed upon the ground surface prior to the passing of the scraper blades thereover which substantially causes the irrigation pipe to be covered with earth.

14 Claims, 4 Drawing Figures

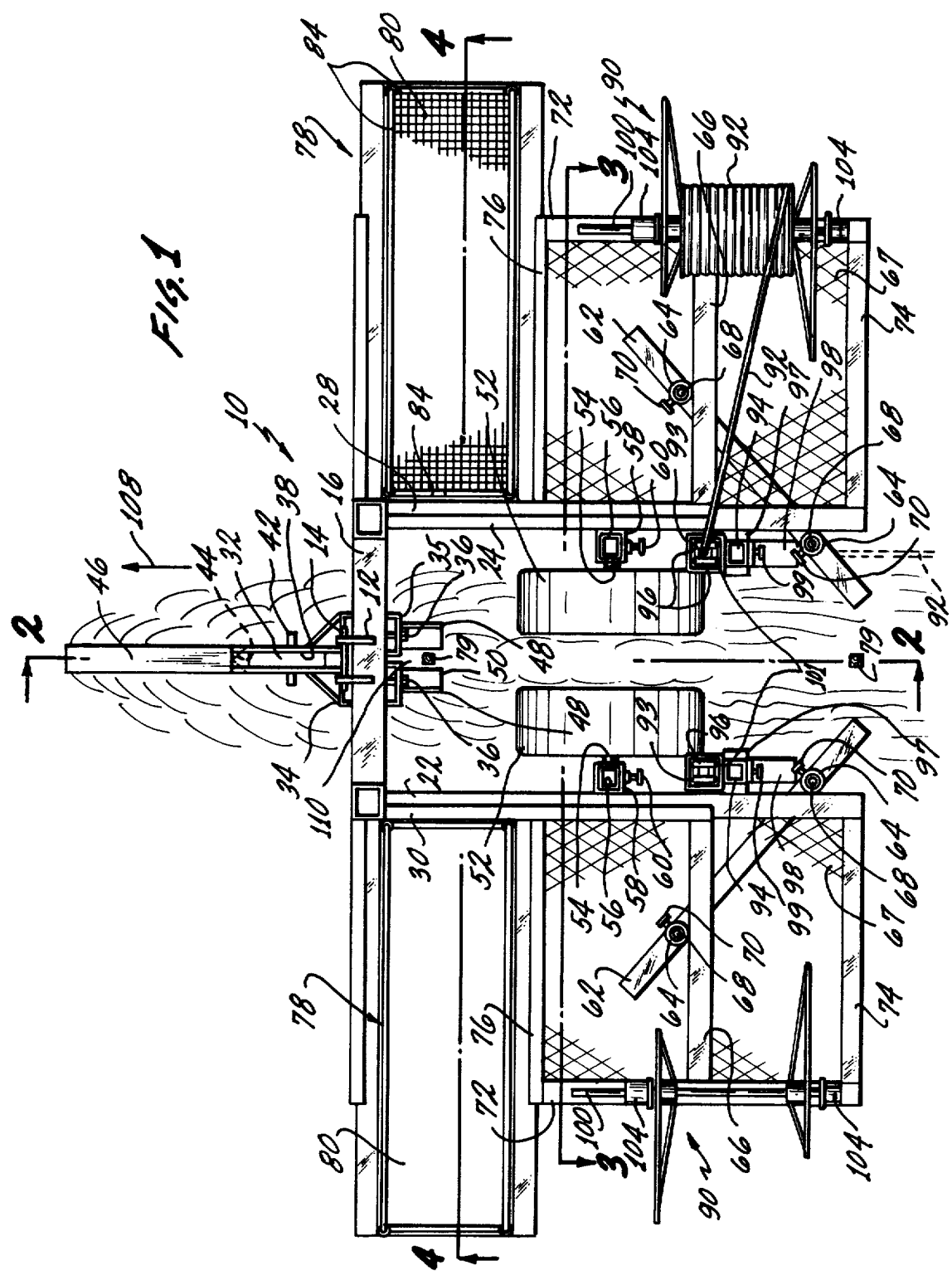

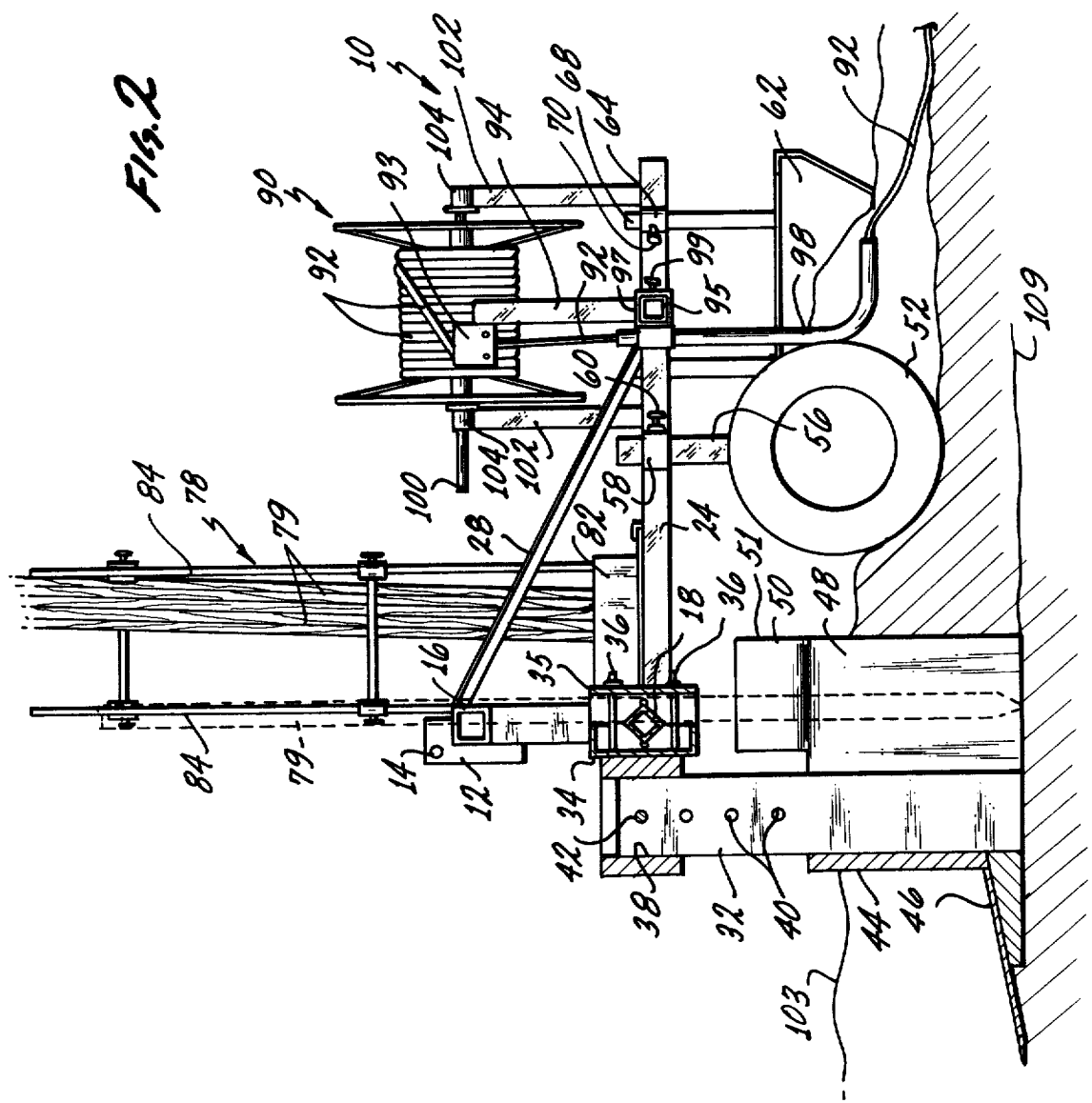

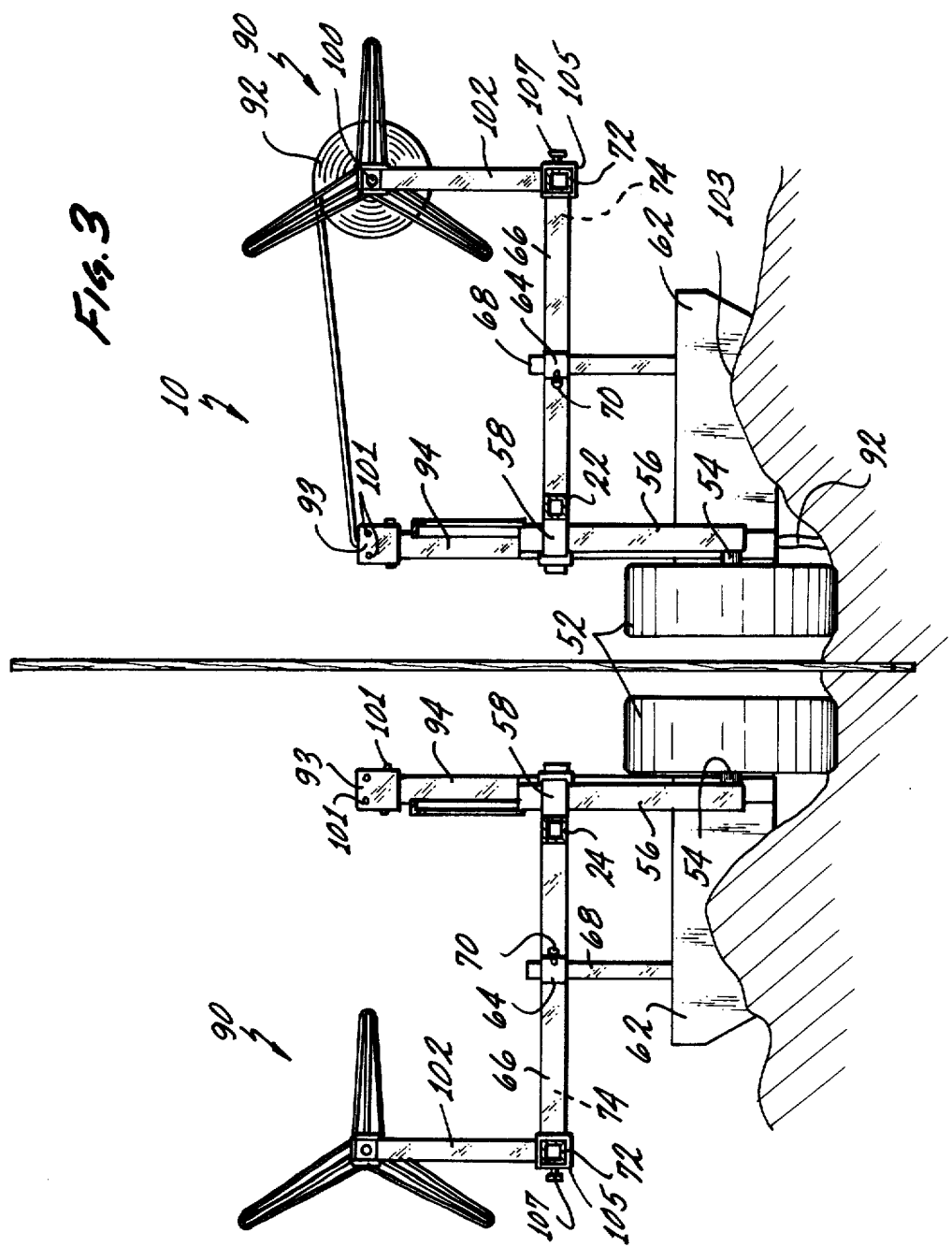

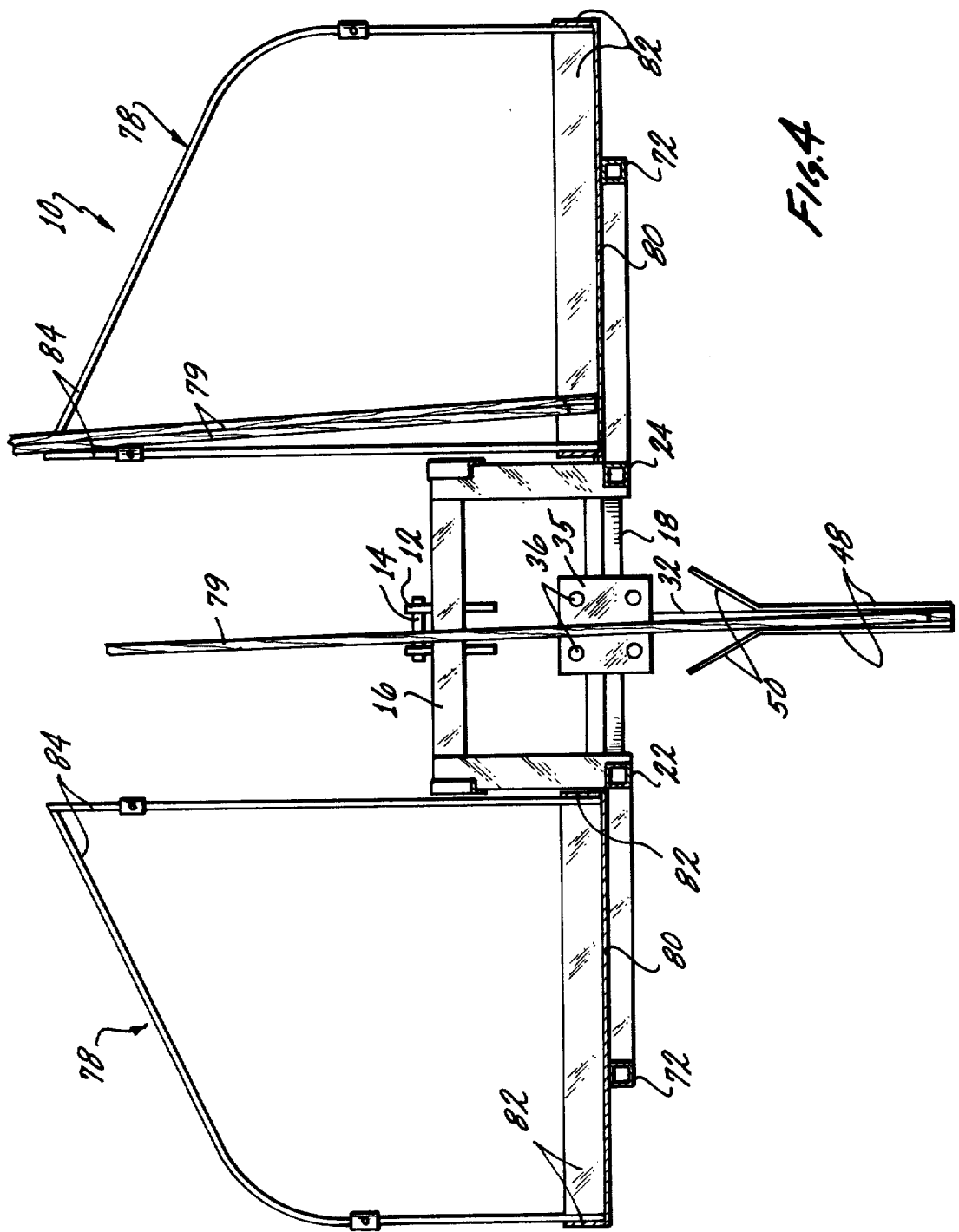

MACHINE FOR USE IN IMPLANTING PLANT SUPPORTING STAKES

BACKGROUND OF THE INVENTION

The invention is directed to a machine for opening and closing a snallow trench in the earth and more specifically to a machine that opens a trench in the earth as it moves along, provides guides for operator insertion of vertical stakes into that trench, compacts the earth around the inserted stakes, replaces at least a portion of the dirt in the trench and levels the earth removed when making the trench to substantially a pre-trench state.

In the art to which the invention relates stakes, posts or poles are more usually set in the earth by power or manually operated stake, post or pole driving means wherein the stake, post or pole is driven into the ground impacting it on the top thereof, by the use of augers to drill a hole in which the stake, post or pole is placed or by means wherein the stake, post or pole is pressed into the ground.

Devices of this type are generally shown in U.S. Pat. Nos. 2,551,896; 3,129,924; and 4,111,135.

The impacting devices are impractical when a large quantity of stakes, posts or poles are used because of large labor costs for their insertion, the span time required for their installation and excessive breakage. The other devices while enjoying a limited success are inefficient when compared to the machine of the instant invention.

SUMMARY OF THE INVENTION

As opposed to known prior art devices used for the same resulting purpose as aforementioned, the instant invention allows for the speedy, efficient installation of thousands of stakes, posts or poles in a relatively short time span with a minimum or no breakage.

The machine of the instant invention is used for the implanting of rows of stakes, posts or poles used in farming for the purpose of supporting growing food producing plants thereon. These plants include tomatoes, beans, grape vines and the like. The growing of tomatoes, as an example, requires the use of approximately twenty-one hundred stakes, posts or poles per acre of planted ground. This number when multiplied by the number of planted acres on a given farm becomes quite large. Accordingly, a twenty acre farm would utilize approximately forty-two thousand stakes, posts or poles. Obviously, the installation of this quantity of stakes, posts or poles would require considerable man hours by conventional methods. Because of the quantity utilized, these stakes, posts or poles are generally made from wood and, therefore, are very susceptible to breakage.

An object of this invention is to provide a machine that with the aid of one or two operators can implant a given quantity of stakes, posts or poles in a reduced number of man hours with reduced breakage.

Another object of this invention is to provide a machine that includes storage means for holding a large number of stakes, posts or poles.

Still another object of this invention is to provide a machine that in addition to providing a means for implanting stakes, posts or poles additionally, provide a means for the laying of and at least partially covering irrigation hose along the rows in a position adjacent the stakes, posts or poles while the stakes, posts or poles are being inserted.

Still another object of this invention is to provide a trencher that provides a shallow trench for the insertion of stakes, posts or poles, a guide means thereby an operator can insert a stake, post or pole in a substantially vertical position in the trench, tamping means for tamping the earth adjacent the inserted stake, post or pole for holding the stake, post or pole in its placed vertical position and a pair of scraper blades for scraping a portion of the earth removed from the trench back into the trench and smoothing the earth surface adjacent the trench to substantially its original condition.

These and other objects and features of the invention will become apparent upon the perusal of the hereinafter following detailed description in conjunction with the drawings.

BRIEF DESCRIPTION OF THE DRAWINGS

FIG. 1 is a plan view of the machine of the instant invention;

FIG. 2 is a showing of the machine taken along line 2—2 of FIG. 1;

FIG. 3 is a showing of the machine taken along line 3—3 of FIG. 1; and

FIG. 4 is a showing of the machine taken along line 4—4 of FIG. 1.

DETAILED DESCRIPTION OF THE PREFERRED EMBODIMENT

Throughout the description the same numeral will be used to depict the same or identical part or element.

The trencher/stake, post or pole implanting machine according to the instant invention comprises a unit adapted to be pulled along the ground by a conventional tractor, caterpillar or a like mobile power vehicle (not shown). The width of the machine of the instant invention is generally equal to or less than the width of the pulling device so as to operate across the narrowest span of ground possible to maximize field production.

Throughout the description the term "stake" will denote either a stake, post or pole.

Referring now to FIGS. 1-3, the trencher/stake implanting machine 10 is connected to a mobile power source through draw pin 14 connected to a front bracket 12. The front bracket 12 is rigidly attached to the horizontal frame member 16. Horizontal frame member 16 is supported by a central frame member 18, and longitudinal frame members 22, 24 through vertical frame members 26. Braces 28, 30 extend and are rigidly attached to frame members 22, 24, and frame member 16 and provide support between its attached frame members.

A trencher blade assembly 32 is attached to the central frame member 18 by bracket assembly 34 and back plate 35 which are secured to the central frame member 18 by bolt and nut combinations 36. The trencher blade may also be attached to central frame member 18 by conventional welding methods. The trencher blade assembly 32 is vertically adjustable with respect to frame member 18 along track 38 and held in a selected vertical position by aligning one of the apertures 40 with the aperture in the bracket assembly 34 and inserting the keeper bolt or pin 42 through the aligned apertures.

The forwardmost edge of the trencher blade assembly 32 includes a sharp or pointed nose 44 and a lower end protruding digger blade 46. The digger blade 46 extends forward and downward from its trencher nose connection. A pair of parallel plates 48 extend rearwardly from the trencher blade assembly nose 44. The upper portion 50 of the parallel plates 48 are angled outwardly. The overall cross-sectional appearance of the combined parallel plates 48 and upper portions 50 thereof is substantially that of a "Y" (see FIG. 4). The forward edges of the parallel plates are terminated at the trencher blade nose 44 while the distal ends 51 of the parallel plates are free and unjoined.

Rearwardly of the trencher blade assembly and the parallel plates 48 are a pair of tamper wheels 52 attached to longitudinal frame members 22, 24. The tamper wheels shown in this embodiment are conventional automotive wheels with pneumatic tires, various other types of wheels and tire combinations could be used equally as well to practice this invention. The axles 54 are supporting the wheels 52 are attached to positionable vertical frame members 56, one vertical frame member 56 is associated with each longitudinal frame member 22, 24. Each frame member 22, 24 has a locking channel member 58 secured thereto generally by conventional welding means. The vertical frame members 56 are sized to provide a snug slide fit within locking brackets 58 so that when locking bolt 60 is loosened the vertical frame members will slide therein and when the locking bolt is tightened the vertical frame members 56 will be fixed in their vertical position. The locking means 60 shown comprises a threaded aperture through the locking brackets 58 in which a bolt 60, or the like, is threadedly engaged. The inner end of bolt 60 either passes into a convenient aperture or dimple (not shown) in its associated vertical frame member 56 or is merely forced against the outer engaging surface of vertical frame member 56 wherein the vertical frame member is held in vertical position by friction from the end of bolt 60. It should be obvious that a plurality of convenient apertures or dimples along the vertical frame member 56 would be required for selective vertical positioning of the tamper wheels 52. Although the vertical frame members and mating locking brackets are shown as rectangular in cross-section a tubular configuration would work equally as well to practice the invention.

A pair of scraper blades 62 are attached through a pair of spaced apart locking brackets 64. The forward most locking bracket 64 is attached to a transverse frame member 66 which is attached by, for example, welding means to the longitudinal frame members 22, 24 and forms a center support for the operator support floor 67 hereinafter discussed. The second locking bracket 64 for each scraper blade 62 is attached to its associated longitudinal frame members 22, 24 rearwardly of the transverse frame member 66 by conventional welding means or the like. The vertical adjustment of the scraper blades is performed in substantially the same manner as the tamper wheel vertical adjustment. Inner vertical support members 68 are attached to the scraper blades 62 and have a snug sliding engagement within locking brackets 64 and are selectively locked in vertical position by locking means 70 in the same manner as locking means 60 hereinbefore discussed. Although the vertical support members are shown as tubular in cross-section as are the locking brackets, they could be rectangular in cross-section and work equally as well to practice this invention.

A longitudinal frame member 72 and transverse frame members 74, 76 provide the remaining support frames for the operator support floor 67. The operator support floor 67 is of an open mesh or screen material construction. The open mesh or screen material can be constructed of any metal, plastic or wood material suitable for the purpose intended, namely, to support a human operator of the device under various earth surface conditions.

Forward of each operator support floor 67 is a stake storage container 78 which is either fixed in position or removable for stake loading for the storing of a plurality of stakes 79. The storage container 78 is comprised of a floor 80 constructed from any suitable material for supporting the weight of the plurality of stakes of a small cross-section contained therein; a short upstanding wall 82 surrounding the outer edge of the floor 80 and upright curvilinear formed tubular frame members 84. The storage container is supported by frame members 76, 86, 88 to which it is either permanently or removably attached for the pre-loading of stakes.

Referring now specifically to FIG. 3, there is shown an irrigation pipe laying assembly. This assembly comprises a pair of reels 90 for supporting a substantial quantity of coiled irrigation hose 92. The hose 92 is shown as a flat type hose generally utilized in modern drip irrigation systems. Other types and shapes of hoses may be utilized with equal success in practicing this invention. The free end of the irrigation hose 92 passes through a guide member 93 which is attached to the upper end of a vertical frame member 94. The guide member 93 guides the hose through an angle of approximately 90° from the reel 90 through the guide member 93. Guide member 93 includes two pair of guide means 96. Guide means 96 are shown as two pair of rollers. The pairs are positioned one above the other in a transverse relationship and are rotatable on axles 101 as the hose 92 passes therealong. It should be understood that fixed guide means 96 constructed of a lubricious material may be employed with equal success. The hose 92 passes through guide member 93 along guide means 96 and thence into the directing tube 98 (see FIG. 2). The tubes shown being rectangular in cross-section. It should be understood that for tubular hose the directing tube may also be tubular. The distal ends of the directing tubes 98 are at substantially right angles with its upper hose receiving end and are positioned slightly below the normal terrain surface over which the machine of the invention travels. The vertical frame members 94 are attached to their associated longitudinal frame member 22, 24 through a rearward extending inverted "L" shaped frame member 95 by a locking bracket 97 which snuggly engages locking bracket 97 of frame member 95 and is slidable thereon. A locking member 99, similar to locking members 60, 70 hereinbefore discussed, is provided on locking bracket 97 wherein vertical frame member 94 is vertically positionable.

Reels 90 are shown as having three upstanding sides 91 for support of the quantity of hose 92 thereon. It should be understood that reel 90 may be of any type suitable for the purpose intended as described herein. The central axles 100 passing centrally through reels 90 are supported by bearings 104 which are supported by vertical upright frame members 102. The vertical upright frame members 102 are positionable along longitudinal frame member 72. The lower ends of vertical upright frame members 102 are attached to a locking bracket 104 that captures longitudinal member 72 and provides a snug sliding fit therealong. A locking member 106 operable as locking members 60, 70, 99 hereinbefore discussed. The longitudinal positioning of vertical upright frame members 102 allows the reels to be loaded with hose 92 of various dimensioned coils.

OPERTION OF THE EMBODIMENT SHOWN

Prior to operation of the machine of the instant invention, various vertical adjustments to the components of the device are set according to their functional requirements typically as shown in FIG. 2. Namely, the trencher blade 32 is adjusted to a suitable vertical position depending on the type of terrain 104 over which it will operate and the depth required for properly implanting each of the plurality of stakes 79. Numeral 106 depicts the trench depth for a typical trencher blade vertical position. The tamper wheels 52 are positioned vertically approximately midway between the normal surface level of the terrain 104 and the bottom 106 of the trench. The distal ends of tubes 98 extend slightly below the normal surface level 104 of the terrain. The vertical position of the scraper blades with respect to the tamper wheels for typical operation are shown in FIG. 3.

The device is attached through attachment means, as hereinbefore discussed, to a mobile power unit, as for example, but not limited to, a farm tractor or the like. As the machine 10 is then pulled along the terrain 104 into which the stakes 79 are to be implanted, in the direction of arrow head 108 (see FIG. 1), protrusion 46 and trencher blade nose 44 force the dirt on either side of parallel plates 48 to separate forming a trench thereby. Operators (not shown), generally two in number, one standing on each operator support floor 67 take stakes 79 from container 78 and in sequential order insert a single stake 79 into narrow opening 110 between the parallel plates 48. The upper angled surfaces 50 above the opening 110 aid in guiding the stakes 79 into that narrow opening. The frequency of operator stake 79 insertion depends on the forward speed of the machine 10 vs. the spacing desired between each upstanding stake 79. After the stake 79 has been inserted into narrow opening 110 and the machine continues to move in the direction of arrow 108 (moving away from the stake), the tamper wheels force a portion of the loose dirt removed when forming the trench back into the trench and around the inserted stake 79. After the tamper wheels pass by the stake, the scraper blades 62 substantially close the trench and return the surface to its pre-trenched 104 surface condition. When it is desirable to lay irrigation hose 92, the hose is fed through the guide member 93, delivery tube 98 and is deposited on the ground, initially it may require securing the hose to the depressed terrain surface, as the machine continues to move forward the hose unreels and is fed continually to the depressed terrain surface rearward of the machine and is substantially covered with the dirt positioned by the scraper blades thus effectively implanting the hose adjacent each side of the stakes 79 along the stake rows.

The attachment to the mobile power unit (tractor or the like) is a vertically and horizontally rigid connection wherein the vertically positioned components are substantially fixed in vertical position with respect to the mobile power unit.

Having described the invention it is to be understood that changes can be made in the described embodiment by one skilled in the art within the spirit and scope of the hereinafter following claims.

I claim:

1. A trenching machine to be drawn behind a mobile power unit for use in implanting into the earth support stakes for growing plants;
   trenching means for forming a trench in the earth over which the machine traverses;
   first guide means for guiding said stakes to a substantially vertical position within said trench;
   tamper means for tamping the earth adjacent said trench inserted stakes;
   scraper means for scraping at least a portion of the earth disturbed in forming said trench into said trench and for substantially leveling said disturbed earth adjacent thereto; and
   means for depositing irrigation hose adjacent to said trench prior to scraping at least a portion of the earth disturbed in forming said trench into said trench and substantially leveling said disturbed earth.

2. The invention as defined in claim 1, wherein said irrigation hose is positioned on each side of said stakes.

3. The invention as defined in claim 1, wherein said means for depositing said irrigation hose comprises reels carried by said machine and positioned one on each side of said trench, hose carried by said reels and second guide means associated with each reel for guiding said hose to a position parallel with said trench and adjacent thereto.

4. The invention as defined in claim 1, wherein said trenching means is vertically adjustable.

5. The invention as defined in claim 1, wherein said trenching means includes a forward protruding and downward slanted digging member.

6. The invention as defined in claim 1, wherein said trenching machine further comprises stake storage means for storing a plurality of stakes.

7. The invention as defined in claim 6, wherein said stake storage means comprises two storage bins, one positioned on each trench adjacent side.

8. The invention as defined in claim 1, wherein said machine further comprises operator platform means for supporting at least one operator while placing said stakes into said trench.

9. The invention as defined in claim 8, wherein said operator platform means comprises two platforms with one positioned on each trench adjacent side.

10. The invention as defined in claim 1, wherein said first guide means comprises parallel vertical rigid wall members, said wall members being spaced apart a distance greater than the width of said stakes and guide members attached to the upper surface of said rigid wall members, said guide members extending angularly away from their rigid wall member attachment.

11. The invention as defined in claim 10, wherein said first guide means is rigidly attached to said trenching means and vertically adjustable therewith.

12. The invention as defined in claim 1, wherein said tamper means comprises a pair of vertically adjustable rotatable wheels positioned one on each side of said trench.

13. The invention as defined in claim 1, wherein said scraper means comprises a pair of vertically positionable blades, one positioned on each side of said trench, said blades angled rearwardly toward said trench.

14. The invention as defined in claim 3, wherein said second guide means comprises tubular guide means.

* * * * *